(12) United States Patent
Chow et al.

(10) Patent No.: US 7,648,692 B2
(45) Date of Patent: Jan. 19, 2010

(54) COS-CLAUS CONFIGURATIONS AND METHODS

(75) Inventors: Thomas King Chow, Irvine, CA (US); John Gebur, El Monte, CA (US); Satish Reddy, Irvine, CA (US); Vincent Wai Wong, Hacienda Heights, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 0 days.

(21) Appl. No.: 11/568,009

(22) PCT Filed: Apr. 22, 2004

(86) PCT No.: PCT/US2004/012821

§ 371 (c)(1),
(2), (4) Date: Sep. 9, 2008

(87) PCT Pub. No.: WO2005/113124

PCT Pub. Date: Jan. 12, 2005

(65) Prior Publication Data

US 2009/0004096 A1    Jan. 1, 2009

(51) Int. Cl.
*B01J 12/02* (2006.01)
*C01B 17/04* (2006.01)

(52) U.S. Cl. .................. 423/574.1; 422/188; 422/189; 422/190; 422/191; 422/193; 422/194

(58) Field of Classification Search .............. 423/574.1; 422/188–191, 193, 194
See application file for complete search history.

(56) References Cited

U.S. PATENT DOCUMENTS

| | | | | |
|---|---|---|---|---|
| 3,725,531 | A * | 4/1973 | Pearson et al. | 423/244.03 |
| 4,035,474 | A * | 7/1977 | Kunkel et al. | 423/574.1 |
| 4,085,199 | A | 4/1978 | Singleton | |
| 4,153,674 | A * | 5/1979 | Verloop et al. | 423/575 |
| 4,735,788 | A | 4/1988 | Voirin | |
| 4,908,201 | A | 3/1990 | Cabanaw | |
| 5,106,607 | A * | 4/1992 | Chopin et al. | 423/564 |
| 5,352,433 | A | 10/1994 | Watson | |
| 5,514,351 | A | 5/1996 | Buchanan et al. | |
| 6,096,280 | A * | 8/2000 | Ellenor et al. | 423/242.1 |
| 6,113,872 | A | 9/2000 | Nougayrede | |

* cited by examiner

*Primary Examiner*—Timothy C Vanoy

(57) ABSTRACT

Carbonyl sulfide (COS) from a COS-containing stream (106) is convened in a Claus plant (100) to elemental sulfur (152, 162) by oxidation of a first portion of the COS-containing stream to $SO_2$ and by hydrolysis of a second portion of the COS-containing stream to $H_2S$. In preferred aspects of the inventive subject matter, hydrolysis and/or oxidation of the COS is performed in the reactor furnace (10), while hydrolysis of the COS is performed in the reactor furnace (10), a hydrolysis reactor, and/or a catalytic converter (120, 130, 150).

18 Claims, 2 Drawing Sheets

US 7,648,692 B2

COS-CLAUS CONFIGURATIONS AND METHODS

FIELD OF THE INVENTION

The field of the invention is conversion of COS to elemental sulfur, and particularly in a Claus plant.

BACKGROUND OF THE INVENTION

Current feed gases to a Claus process are typically limited to relatively low carbonyl sulfide (COS) concentrations, and it is generally believed that the COS concentration in the feed gas for a conventional Claus process can not exceed about 2% without significantly reducing the desulfurization efficiency, and/or compromising the flame temperature for destruction of contaminants (e.g., ammonia, aromatics, including benzene, toluene, and xylene, and/or hydrocarbons).

Consequently, numerous desulfurization processes are specifically configured to provide a feed gas with relatively low COS content to a Claus plant. Alternatively, and especially where the COS concentration in a feed gas is relatively high, hydrolysis of the COS in the fed gas using a TiO2 catalyst bed is often employed before the feed gas is fed into the Claus process. Exemplary configurations using pre-Claus COS hydrolysis are described in U.S. Pat. Nos. 4,735,788 or 6,113,872, both of which are incorporated by reference herein. While such processes generally reduce the COS concentration to levels that are considered suitable for known Claus plants, various disadvantages nevertheless remain. Among other things, COS hydrolysis generally requires relatively high capital and operating costs.

Therefore, although there are various configurations and methods known in the art to provide a feed gas with a relatively high COS content to a Claus plant, all or almost all of them suffer from one or more disadvantage. Consequently, there is still a need for improved Claus process configurations and methods.

SUMMARY OF THE INVENTION

The present invention is generally directed to conversion of COS to elemental sulfur and byproducts using a Claus plant configuration. In preferred aspects of the inventive subject matter, COS of a first portion of a COS-containing stream is converted to sulfur dioxide, and COS of a second portion of the COS-containing stream is converted to H$_2$S, and the so generated sulfur dioxide and hydrogen sulfide are then processed to sulfur and water using a catalytic reactor.

In one aspect of the inventive subject matter, a Claus plant will include a reaction furnace that receives a first portion of a COS-containing stream to form sulfur dioxide from the COS. A catalytic converter coupled to the reactor then receives the sulfur dioxide from the reaction furnace, and further receives a second portion of the COS-containing stream to form hydrogen sulfide from the COS. The so generated sulfur dioxide and the hydrogen sulfide will subsequently react in the converter to form elemental sulfur.

In especially preferred configurations, it is contemplated that the reaction furnace further receives a stream comprising hydrocarbon, ammonia, hydrogen sulfide, an organic sulfide, water, oxygen, and/or air. Furthermore, suitable configurations will include additional catalytic converters (preferably in series with the first converter), which may receive further portions of the COS-containing stream to form hydrogen sulfide from the COS.

In another aspect of the inventive subject matter, a Claus plant will include a reaction furnace that receives in a first section at least a portion of a COS-containing stream to form sulfur dioxide from the COS. A hydrogen sulfide source is further included and provides hydrogen sulfide to a second section of the reaction furnace, wherein the hydrogen sulfide and the sulfur dioxide react in the second section to elemental sulfur (Particularly contemplated hydrogen sulfide sources include a hydrolysis reactor that receives another portion of the COS-containing stream to form the hydrogen sulfide).

Such plants may further include a catalytic converter that receives at least a portion of the hydrogen sulfide from the hydrolysis reactor and at least a portion of the sulfur dioxide from the reactor furnace, wherein the sulfur dioxide and the hydrogen sulfide react in the converter to form elemental sulfur. With respect to the COS concentration of contemplated plants, it is generally preferred that the COS-containing stream comprises at least 5% (mol) COS (e.g., from a precombustion decarbonization unit).

Consequently, a method of converting a COS-containing stream to a sulfur product in a Claus plant may include one step in which a first portion of COS from a COS-containing stream is oxidized in a reaction furnace to form sulfur dioxide. In another step, a second portion of COS from the COS-containing stream is hydrolyzed in at least one of hydrolysis reactor, and a catalytic converter to hydrogen sulfide, and in yet another step, the sulfur dioxide is catalytically reacted with the hydrogen sulfide to form the sulfur product.

Various objects, features, aspects and advantages of the present invention will become more apparent from the following detailed description of preferred embodiments of the invention.

DETAILED DESCRIPTION

The inventors discovered that COS-containing streams may be fed to a Claus plant without loss of desired operating conditions, wherein one portion of the COS is fed to the reaction furnace for oxidation to sulfur dioxide, and wherein another portion is hydrolyzed to hydrogen sulfide (e.g., in a hydrolysis reactor or in the catalytic converter of the Claus plant), and wherein the so produced hydrogen sulfide and sulfur dioxide are reacted to form elemental sulfur.

It should be especially appreciated that using such configurations and methods, 90-98% of the COS in a COS-containing stream (Or even a substantially pure COS stream) can be converted into elemental sulfur while maintaining a Claus conversion environment. Moreover, and at least in some aspects, contemplated configurations allow operation of a Claus plant without the need for an upstream hydrolysis reactor, wherein the Claus plant receives substantial quantities (e.g., greater than 2 mol %) of COS.

Figure 1:
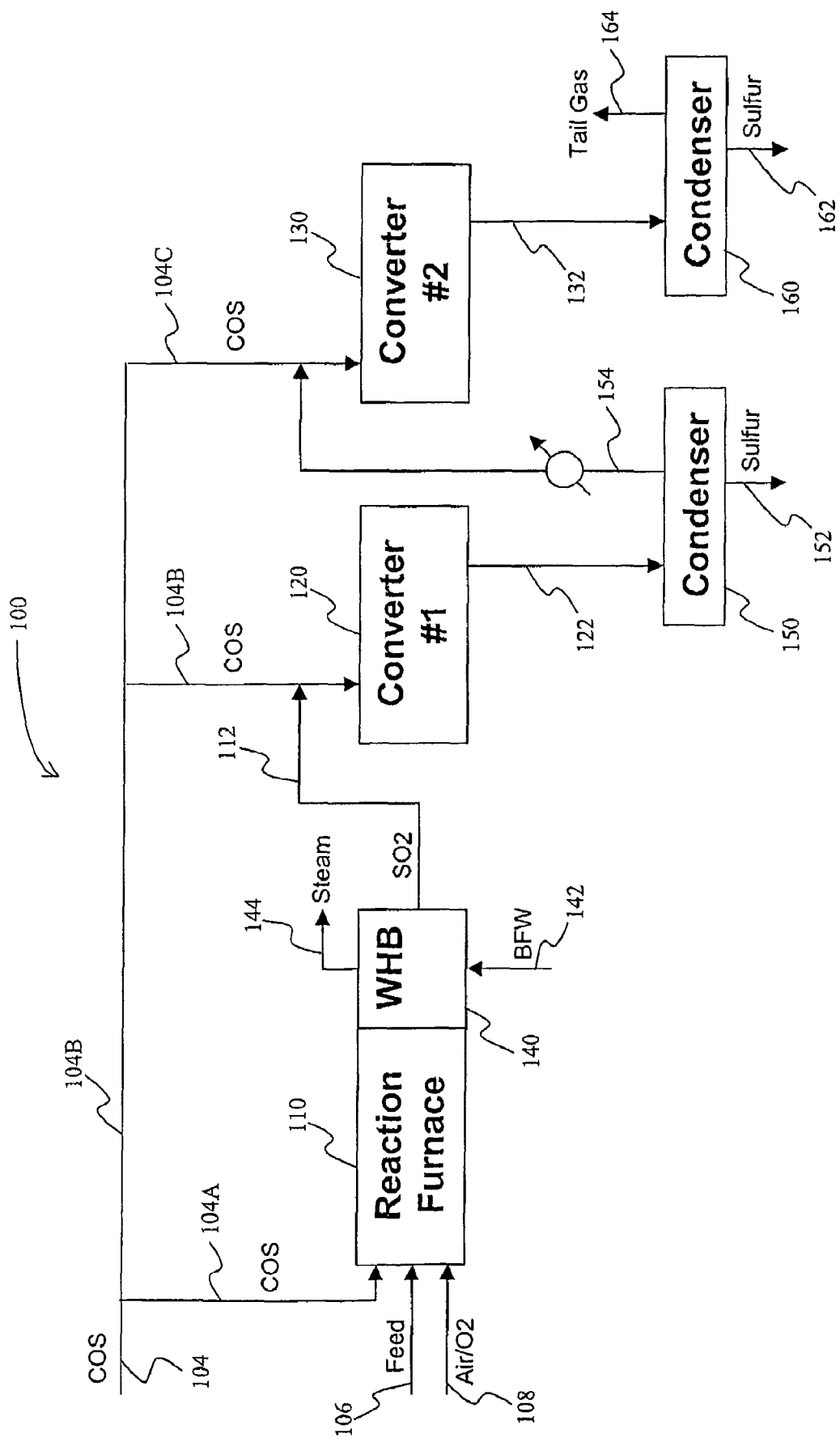
FIG. 1 is one exemplary configuration for COS conversion according to the inventive subject matter.

In one preferred aspect of the inventive subject matter, an exemplary Claus plant has a configuration as depicted in FIG. 1. Here, Claus plant 100 includes a reaction furnace 110 that is thermally coupled to waste heat boiler 140 in which steam 144 is produced from boiler feed water 142. Reaction furnace 110 receives a feed stream 106, which may include various combustible components and sulfurous compounds (e.g., mercaptans, hydrogen sulfide, etc.). Combustion and/or flame temperature is regulated or maintained via air/oxygen stream 108. Additionally, reaction furnace 110 receives a first portion 104A of COS-containing stream 104, while a second portion 104B and optionally third portion 104C of the COS-containing stream 104 are fed to catalytic converter 120 and 130, respectively.

Reaction furnace 110 is typically operated such that most, if not substantially all of the contaminants (e.g., ammonia, hydrocarbons, etc.) are thermally destroyed, and that one third of the COS in the COS-containing stream 104 is oxidized to sulfur dioxide. Thus, it should be recognized that, depending on the composition of the COS-containing stream 104 and the feed stream 106, the ratio of first portion 104A to the second portion 104B (and 104C) may vary. However, it is generally preferred that the first portion 104A is between about 20-40% of the total stream 104. Similarly, and again predominantly depending on the chemical composition of the feed stream 106 and/or stream 104A, the flame temperature may vary substantially, but is preferably maintained at a temperature of between about 1800° F. to about 2800° F. depending on the contaminants in the feed streams.

The gas effluent from the reaction furnace 110, predominantly comprising sulfur dioxide, water and carbon dioxide, is cooled in the waste heat boiler to about 400° F. to 500° F. to form cooled effluent stream 112 that is combined with the second portion 104B of the COS-containing stream 104 before introduction into the first catalytic converter. It should be recognized that in such configurations, the COS of stream 104D will be hydrolyzed in the converter to hydrogen sulfide, and that the so produced hydrogen sulfide will react with the sulfur dioxide from the cooled effluent stream 112 to elemental sulfur leaving the catalytic converter 150 as product stream 122. Product stream 122 is then fed to the condenser 150 in which the elemental sulfur is condensed (preferably at a temperature of about 280° F.-350° F.) to sulfur product 152.

The condenser effluent 154 is then reheated to a temperature of about 400° F.-500° F. and combined with the third portion 104C of COS-containing stream 104, as the Claus process is an equilibrium-driven process. Therefore, the remaining sulfur dioxide in the condenser effluent 154 will react with the hydrogen sulfide that is formed by hydrolysis of the COS in the second catalytic converter 130 in a similar fashion as described above for the first catalytic converter 120. Product stream 132 is fed to the second condenser 160 to remove elemental sulfur as sulfur product 162 from the tail gas 164 that can then be further processed as needed using conventional technology. Of course, it should be appreciated that suitable Claus plants may have a third, fourth, and even higher catalytic converter to reduce the residual sulfur concentration in the tail gas as desired. In the event that feed 106 contains hydrogen sulfide, this hydrogen sulfide will react with the sulfur dioxide formed in the reaction furnace 110 to form elemental sulfur in reaction furnace 110, converter #1 120 and converter #2 130 in accordance with the Claus reaction (streams 112, 154 and 164 typically contain some hydrogen sulfide in addition to sulfur dioxide).

With respect to the feed gas, it should be recognized that various feed gases as suitable, and that the particular nature of the feed gas is not limiting to the inventive subject matter so long as such feed gas can be at least partially oxidized in the reaction furnace. For example, suitable feed gases include acid gases from an amine stripping unit, sour gases from a sour water stripper, membrane filtration unit, and other sources that provide gases with substantial sulfur content. Therefore, contemplated feed gases will not only include hydrogen sulfide, but also numerous other sulfurous compounds, including COS (preferably at concentrations lower than 2 mol %), $CS_2$, mercaptans, and di- and polysulfides. Further included in most feed gases will be one or more of aromatic hydrocarbons (e.g., benzene, toluene, xylene), ammonia, and/or various other hydrocarbons (e.g., linear and branched hydrocarbons, typically comprising less than 5 carbon atoms).

Similarly, the chemical composition and source of the COS-containing stream may vary substantially, and it should be recognized that the COS concentration in such streams may be between 1 mol % (and even less) to about 95 mol % (and even higher). However, it is particularly preferred that the COS-containing stream is provided at least in part by a precombustion decarbonization plant, and particularly preferred precombustion decarbonization plants are described in our copending U.S. provisional patent application with the Ser. No. 60/460,363, which was filed Apr. 3, 2003, and which is incorporated by reference herein. Furthermore, it should be appreciated that the first portion of the COS-containing stream may also be combined with the feed stream, or where the feed stream comprises a significant amount of COS, that the first portion may be omitted altogether.

Therefore, the ratio of the first portion to the second portion will generally vary depending on various factors, but especially on the amount of COS present in the feed stream and/or the COS-containing stream. Similarly, the ratio of the second to the third portion will vary, but is typically such that the COS in the third portion will be substantially completely consumed by the reaction with the sulfur dioxide of the first condenser effluent via conversion of the COS to hydrogen sulfide. Furthermore, while it is generally preferred to combine the reaction furnace effluent and the second portion (and/or the condenser effluent and the third portion) before entering the catalytic converter, it should also be recognized that these streams may be separately feed into the catalytic converters.

With respect to the reaction furnace, the waste heat boiler, the reheater(s), the catalytic converters, and the sulfur condensers, it should be appreciated such components generally need not be modified for contemplated configurations, but that these components may be employed in such configurations as currently used in the art.

Therefore, it should be recognized that contemplated Claus plants may include a reaction furnace that receives a first portion of a COS-containing stream to form sulfur dioxide from the COS, and a catalytic converter, preferably comprising a titanium oxide or a cobalt-molybdenum catalyst, that (a) receives the sulfur dioxide from the reactor furnace, and (b) that receives a second portion of the COS-containing stream to form hydrogen sulfide from the COS, wherein the sulfur dioxide and the hydrogen sulfide react in the converter to form elemental sulfur. In especially preferred configurations, the reaction furnace further receives a stream comprising at least one of a hydrocarbon, ammonia, hydrogen sulfide, an organic sulfide, water, oxygen, and air. Therefore, especially preferred sources for the COS-containing stream include precombustion decarbonization units, and will typically comprise at least 5 mol % COS. A second catalytic converter may be serially coupled to the catalytic converter and may further receive a third portion of the COS-containing stream to form hydrogen sulfide from the COS.

Figure 2:
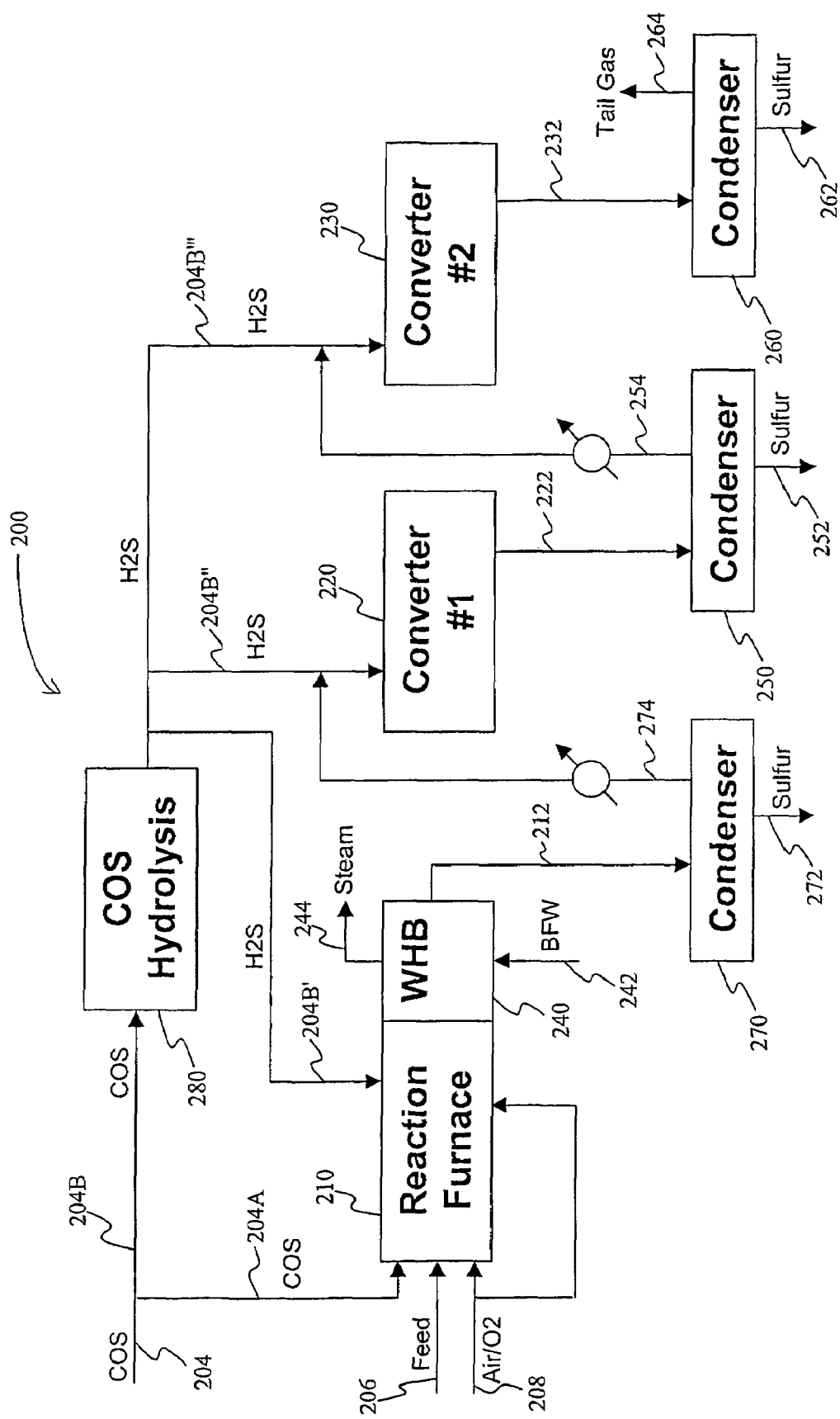
FIG. 2 is another exemplary configuration for COS conversion according to the to inventive subject matter.

In another aspect of the inventive subject matter, especially where the concentration of the COS in the COS-containing stream is relatively high, an alternative configuration may be used in which a portion of the COS is hydrolyzed prior to entering the catalytic converters and/or in which a portion of the COS is reacted with oxygen and/or water in the reaction furnace as depicted in of FIG. 2.

Here, the Claus plant 200 has a reactor furnace 210 that is coupled to a waste heat boiler 240 that forms steam 244 from boiler feed water 242. Similar to the configuration as depicted in FIG. 1 above, a front portion of the reactor furnace receives a feed 206 and appropriate quantities of air/oxygen 208 to maintain proper flame temperature and/or oxidation of the sulfurous compounds. A first portion 204A of the COS-containing stream 204 is fed into the reactor furnace for oxidation to sulfur dioxide, while a second portion 204B of the COS-containing stream 204 is fed to a COS hydrolysis reactor 280. A first portion of the COS hydrolysis reactor effluent 204B' is fed into the rear portion of the reaction furnace and will react to elemental sulfur of other sulfur containing compounds according to the Claus chemistry. Consequently, the reaction furnace effluent 212 is fed to a first condenser 270 in which the elemental sulfur is removed as a sulfur product 272.

The condenser effluent 274 is then reheated and combined with a second portion 204B" of the hydrogen sulfide stream that is produced in the COS hydrolysis reactor 280. The combined stream enters the first catalytic converter 220, and the hydrogen sulfide from the hydrolysis reactor and the sulfur dioxide from the first condenser effluent react in a Claus reaction to form elemental sulfur. The catalytic converter effluent 222 is then fed to the condenser 250 in which the elemental sulfur is removed as sulfur product 252, and the condenser effluent 254 is reheated and mixed with a third portion of the hydrogen sulfide stream 204B''' before entering the third converter 230. Again, remaining sulfur dioxide from the condenser effluent 254 and the hydrogen sulfide from stream 204B''' react to form elemental sulfur in the catalytic converter 230, from which the effluent 232 is fed to the condenser 260. Elemental sulfur is removed from the condenser 260 as sulfur product 262 and tail gas 264 leaves the Claus plant (Streams 212, 274, 254 typically contain some hydrogen sulfide in addition to sulfur dioxide).

With respect to the COS hydrolysis reactor, it should be recognized that all known hydrolysis reactors are considered suitable for use herein, and exemplary COS hydrolysis reactors are described, for example, in U.S. Pat. Nos. 4,332,781, and 5,674,463, both of which are incorporated by reference herein. However, it is generally preferred that COS hydrolysis is performed using suitable hydrolysis catalysts, including nickel, platinum, and palladium. With respect to the remaining components and conditions, the same considerations as described above apply.

Consequently, especially suitable Claus plants will include a reaction furnace that receives in a first section at least a portion of a COS-containing stream to form sulfur dioxide from the COS, and a hydrogen sulfide source that provides hydrogen sulfide to a second section of the reactor furnace, wherein the hydrogen sulfide and the sulfur dioxide react in the second section to elemental sulfur and other sulfur containing compounds. Such plants may advantageously be coupled to a precombustion decarbonization unit that provides at least part of the COS-containing stream, and optionally further include a hydrolysis reactor that receives another portion of the COS-containing stream to form the hydrogen sulfide.

A catalytic converter (preferably with titanium oxide or a cobalt-molybdenum catalyst) typically receives at least a portion of the hydrogen sulfide from the hydrolysis reactor and at least a portion of the sulfur dioxide from the reaction furnace, wherein the sulfur dioxide and the hydrogen sulfide react in the converter to form elemental sulfur. Most typically a second or third catalytic converter are coupled to the first catalytic reactor.

Therefore, it should generally be recognized that a COS-containing stream can be converted to a sulfur product in a Claus plant by oxidizing a first portion of the COS from the COS-containing stream in a reaction furnace to sulfur dioxide. A second portion of the COS from the COS-containing stream is hydrolyzed and/or oxidized in the reaction furnace, hydrolysis reactor, or catalytic converter to hydrogen sulfide, and the so produced sulfur dioxide and hydrogen sulfide are then catalytically reacted to form the sulfur product in accordance with the Claus reaction.

Depending on the particular plant configuration and/or COS concentration of the COS-containing stream, it is contemplated COS hydrolysis and/or oxidation may be performed in the reaction furnace or catalytic converter (e.g., where the COS concentration is relatively low), or in the hydrolysis reactor (e.g., where the COS concentration is relatively high). However, and regardless of the location of the COS hydrolysis and/or oxidation, it is contemplated that suitable COS concentrations may be at least 5% (mol) COS. With respect to the components and conditions of such methods, the same considerations as described above apply.

Thus, specific embodiments and applications of COS-Claus configurations and methods have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A Claus plant comprising:
   a reaction furnace that receives a first portion of a COS-containing stream to form sulfur dioxide from the COS; and
   a catalytic converter that receives the sulfur dioxide from the reactor furnace, and that further receives a second portion of the COS-containing stream to form hydrogen sulfide from the COS, wherein the sulfur dioxide and the hydrogen sulfide react in the converter to form elemental sulfur.

2. The plant of claim 1 wherein the reaction furnace further receives a stream comprising at least one of a hydrocarbon, ammonia, hydrogen sulfide, an organic sulfide, water, oxygen, and air.

3. The plant of claim 1 further comprising a second catalytic converter that is serially coupled to the catalytic converter.

4. The plant of claim 3 wherein the second catalytic converter receives a third portion of the COS-containing stream to form hydrogen sulfide from the COS.

5. The plant of claim 1 wherein a precombustion decarbonization unit provides the COS-containing stream.

6. The plant of claim 1 wherein the catalytic converter comprises a catalyst that includes titanium oxide or a cobalt-molybdenum.

7. The plant of claim 1 wherein the COS-containing stream comprises at least 5% (mol) COS.

8. A Claus plant comprising:
a reaction furnace that receives in a first section at least a portion of a COS-containing stream to form sulfur dioxide from the COS; and
a hydrogen sulfide source that provides hydrogen sulfide to a second section of the reactor furnace, wherein the hydrogen sulfide and the sulfur dioxide react in the second section to elemental sulfur.

9. The plant of claim 8 wherein a precombustion decarbonization unit provides the COS-containing stream.

10. The plant of claim 8 wherein the hydrogen sulfide source comprises a hydrolysis reactor that receives another portion of the COS-containing stream to form the hydrogen sulfide.

11. The plant of claim 10 further comprising a catalytic converter that receives at least a portion of the hydrogen sulfide from the hydrolysis reactor and at least a portion of the sulfur dioxide from the reaction furnace, wherein the sulfur dioxide and the hydrogen sulfide react in the converter to form elemental sulfur.

12. The plant of claim 10 wherein the catalytic converter comprises a catalyst that includes titanium oxide or a cobalt-molybdenum.

13. The plant of claim 8 wherein the COS-containing stream comprises at least 5% (mol) COS.

14. A method of converting a COS-containing stream to a sulfur product in a Claus plant, comprising:
oxidizing a first portion of COS from the COS-containing stream in a reaction furnace to sulfur dioxide;
hydrolyzing a second portion of COS from the COS-containing stream in at least one of the reaction furnace, a hydrolysis reactor, and a catalytic converter to hydrogen sulfide; and
catalytically reacting the sulfur dioxide with the hydrogen sulfide to form the sulfur product.

15. The method of claim 14 wherein at least one of the steps of hydrolyzing and catalytically reacting are performed in the reaction furnace.

16. The method of claim 14 wherein the step of hydrolyzing is performed in the catalytic converter.

17. The method of claim 14 further comprising a step of providing to the reaction furnace a stream comprising at least one of a hydrocarbon, ammonia, hydrogen sulfide, an organic sulfide, water, oxygen, and air.

18. The method of claim 14 wherein the COS-containing stream comprises at least 5% (mol) COS.

* * * * *